United States Patent [19]

Schmidt

[11] Patent Number: 5,471,686
[45] Date of Patent: Dec. 5, 1995

[54] LIFTING HOSE WITH ENDS SEALED BY A CLAMPING STRIP

[75] Inventor: Peter Schmidt, Eisenharz, Germany

[73] Assignee: Schmidt & Lenhardt GmbH & Co. oHG, Isny, Germany

[21] Appl. No.: 178,499

[22] Filed: Jan. 7, 1994

[30] Foreign Application Priority Data

Jan. 15, 1993 [EP]  European Pat. Off. ............. 93100508

[51] Int. Cl.⁶ ...................................................... A47K 3/12
[52] U.S. Cl. .............................. 4/566.1; 4/564.1; 92/92; 138/109; 254/93 R
[58] Field of Search .................... 4/563.1, 564.1, 4/565.1, 566.1; 254/93 R; 92/92; 138/109; 24/30.5 R, 459, 543

[56] References Cited

U.S. PATENT DOCUMENTS

| | | | |
|---|---|---|---|
| 3,084,961 | 4/1963 | Merriman | 92/92 X |
| 3,379,411 | 4/1968 | Vanderjagt | 254/93 R |
| 4,042,267 | 8/1977 | Clinch et al. | 24/30.5 R X |
| 4,419,776 | 12/1983 | Schmidt | 4/564.1 |
| 4,551,888 | 11/1985 | Beecher | 24/543 X |
| 4,983,047 | 1/1991 | Netto | 383/68 X |

*Primary Examiner*—Robert M. Fetsuga
*Attorney, Agent, or Firm*—Notaro & Michalos

[57] ABSTRACT

Each end of a lifting hose (10) is sealed pressure-tight by means of two clamping strips (12, 14), one strip (12) having a row of projecting pegs (20), and the other strip (14) having holes (30) in a corresponding arrangement. The pegs (20) have thickened heads (24), and the holes (30) are stepped, thus giving rise to annular supporting surfaces into which the heads (24) latch in the clamped position of the two flatly folded layers (40, 42) of the hose (10). FIG. 1

8 Claims, 3 Drawing Sheets

LIFTING HOSE WITH ENDS SEALED BY A CLAMPING STRIP

BACKGROUND OF THE INVENTION

The invention relates to a lifting hose for raising and lowering a lift or swivel platform of a lifting apparatus useful for insertion in a bathtub, the lifting hose consisting of a fabric-reinforced, pressure-tight, flexible, substantially non-expandable material and being sealed pressure-tight at its ends by means of clamping elements.

PRIOR ART

A lifting hose of this kind is known from EP-C-0 347 652. One end of the lifting hose is riveted to the bottom plate of the lifting apparatus by means of a clamping strip. The other end is attached in the same manner to the lower side of the lift platform. During operation, hydraulic water flows into the lifting hose in order to raise the lift platform together with a person sitting or lying thereon. Even though relatively low water pressure is sufficient to operate the apparatus, safety regulations demand that said lifting hose must be capable of withstanding a pressure of more than 25 bar. This means that the clamped connections at the ends of the hose must likewise remain tight under that pressure. Attaching the clamping strip is therefore problematic, because it must first of all fix the end of the hose to the lifting apparatus and must secondly seal the end of the hose tight. In a practical embodiment, the clamping strip is attached to the bottom plate or the lift platform of the lifting apparatus by means of a plurality of rivets. Corresponding holes for these rivets must therefore be drilled in said plate and said platform. Corresponding holes must be drilled in the clamp strips, which, as a rule, are made of metal. Even if it is possible in this way to attach the end of the hose to the lifting apparatus in a pressure-tight manner, the disadvantage nevertheless still remains that, in the event of a fault's developing in the hose, a considerable amount of work is involved in removing the rivets and replacing the faulty hose with a new one.

SUMMARY OF THE INVENTION

The object of the invention is to design a lifting hose with its clamping elements in such a way that the ends of the lifting hose can be securely sealed without a great deal of complex assembly work and that, in the event of a fault's developing in the hose, it is easier to exchange the hose.

This problem is solved according to the invention in that each clamping element consists of two clamping strips with clamping surfaces facing one another and disposed transversely to the longitudinal direction of the lifting hose; the two strips are made of plastic; a plurality of pegs aligned longitudinally protrude at right angles from the clamping surface of one of the two strips, each peg having a cylindrical shank and a thickened head part, and an annular collar being formed between said head and said shank; a plurality of holes terminate at the clamping surface of the respective opposite strip, with one hole in the holed strip assigned to each peg of the peg strip; when the end of the lifting hose is pressed flat, there are punched holes in the two mutually adjacent layers of material, arranged in a manner exactly matching the holes in the holed strip and having a diameter at least equal to the smallest diameter of the holes in the holed strip; each hole in the holed strip has, adjacent to the clamping surface of said strip, a first hole portion of smaller diameter for receiving the shank of a peg, and a second portion of larger diameter for receiving the head of said peg; and that the annular supporting surface formed between the two holed sections supports the annular collar of a peg and forms an inseparable counter-bearing when the two strips are pressed together with the compressed end of the lifting hose inserted between them, the two mutually adjacent layers of the lifting hose having a thinner wall thickness in the region of the clamping surfaces than in the neighboring region.

The invention firstly provides the advantage that the lifting hose, together with its two pairs of clamping strips at each end, forms a single assembly unit which is simple to attach, by means of said pairs of clamping strips, to the lifting apparatus and which is easy to remove therefrom. Two screws, for example, are sufficient to screw the pair of clamping strips tight to the bottom plate or the lift platform, since the screwed connection does not have to contribute to the pressure-tight design of the end of the hose. The other major advantage is the considerable reduction in the amount of work needed to close the end of the hose securely. The two clamping strips with their complementary pegs and receiving holes are injection-moulded plastic parts which match each other precisely and which are dimensioned in such a way that the two strips are inseparably joined together in a press at a high compression force. With a single compression stroke, the two clamping strips are joined together in a positive fit, since the heads of the pegs latch in behind the annular collars of the stepped holes. The pegs thus have a precisely defined position in the holes of the holed strip, so that absolutely repeatable clamping accuracy is guaranteed.

An additional security against the end of the hose's slipping through the gap between the clamping surfaces is achieved, because the two clamping strips are supported in a positive fit on the forced counter-bearing steps of the edge of the hose. The protruding edge of the hose is securely stowed and the visual appearance is pleasing because said edge of the hose can no longer be seen from the front. Thanks to further embodiments of the invention, the clamped hose is deformed into a wave or zigzag shape—when seen in a longitudinal section—and, in the region of deformation, is additionally compressed to a thinner wall thickness along narrow deformation surfaces, whereby the sealing effect is further improved. Lugs and cavities provided at the strips assist the ease of assembly, because the hose can be positioned on the holed strip almost blind by the person carrying out the assembly, in that the hose is placed in position in such a way that the lugs of the holed strip pass through the punched-out sections of the hose. The hose is then immovably fixed to the holed strip, so that it is then only necessary to press the peg strip on. Those lugs have central holes which pass through the whole strip. By means of these via holes, the strip unit can be detachably fixed to the lifting apparatus with a small number of screws. One strip forms a three-sided mount for the other strip. This feature finally, gives the hose seal a particularly pleasing appearance, since the clamped parts of the hose are concealed.

BRIEF DESCRIPTION OF THE DRAWINGS

The invention will now be described in more detail with reference to the drawing, which shows one embodiment.

DETAILED DESCRIPTION

Figure 4:
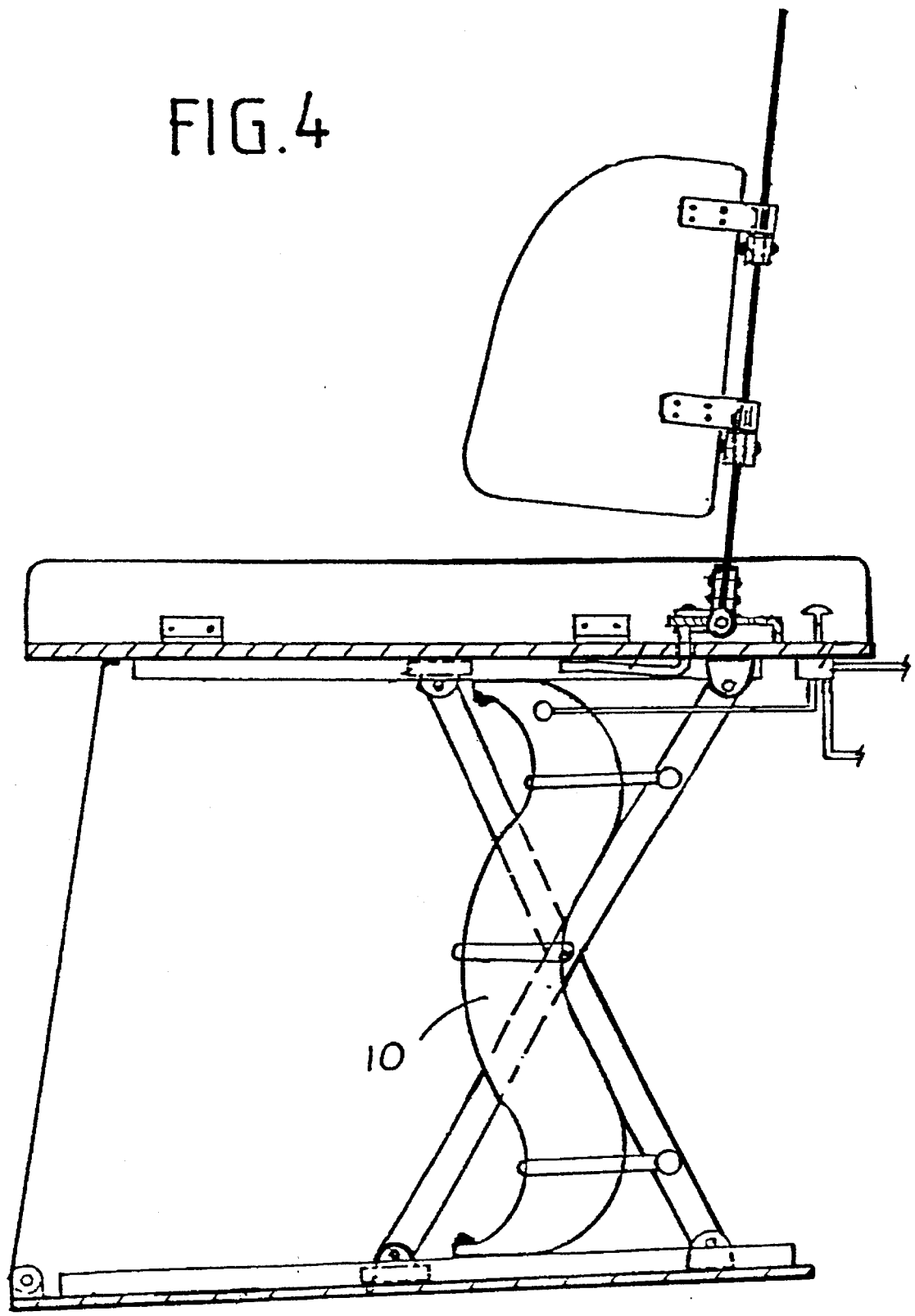
FIG. 4 is a view of a conventional lifting apparatus in which the hose is used with the two clamping strip units in accordance with the invention.

The lifting apparatus shown in FIG. 4 has a lifting hose 10 between a bottom plate and a lift platform. It is a piece of fabric-reinforced plastic hose such as is used in fire-fighting hoses. Said piece of hose is tightly sealed at its ends, so that it can withstand the pressure of hydraulic water of about 30 bar.

Two clamping strips 12, 14 are used to seal the lifting hose 10, clamping strip 12 being designed as a peg strip, and strip 14 as a holed strip. The two strips 12, 14 are injection-moulded plastic parts and are made of high-quality material with a certain elasticity. The two strips 12, 14 have clamping surfaces 16, 18 of equal size, the length of which, measured at right angles to the length of the hose, is approximately equal to half the circumference of the hose. Projecting at right angles from the clamping surface 16 of the peg strip 12 are four pegs 20 disposed on the central longitudinal midplane of said strip 12, which pegs 20 consist of a shank 22 and a thickened head 24. The shank is 5.2 mm. in diameter, whereas the head is 6 mm. in diameter. An annular collar 26 is thus formed between the shank and the head, the radial width of which is 0.4 mm. Said annular collar 26 expands conically from the shank 22 to the head, at an angle of about 45°. Adjacent to the annular collar 26 is a cylindrical portion, followed by a portion tapering conically towards the head end. The holed strip 14 has four stepped holes 30 whose arrangement corresponds to that of the pegs 20. The holes are likewise disposed on the central longitudinal midplane of the clamping surface 18 of the holed strip 14. Each hole consists of a hole portion 32 of smaller diameter adjacent to the clamping surface 18, followed by a hole portion 34 of larger diameter, an annular supporting wall 36 being formed between the two hole portions 32, 34. Said supporting wall 36 is likewise conical in shape and is disposed so as to be complementary to the annular collar 26. The diameter of the hole portion 32 is 5.3 mm., which means that it is 0.1 mm. larger than the diameter of the peg 20. The hole portion 34 is 6 mm. in diameter, which means that it is equal to the greatest diameter of the head 24.

Figure 1:
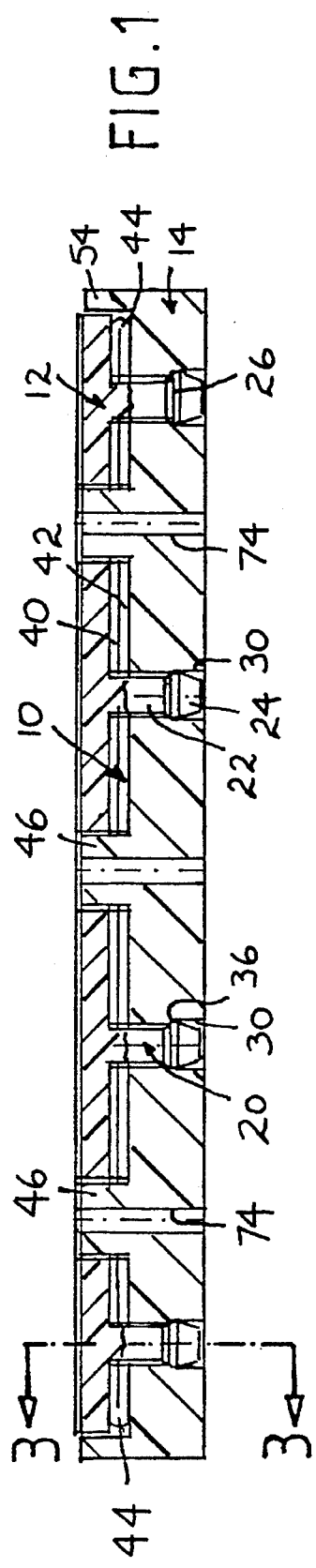
FIG. 1 shows a longitudinal section through the clamping strip unit, with a hose clamped in place.
Figure 2:
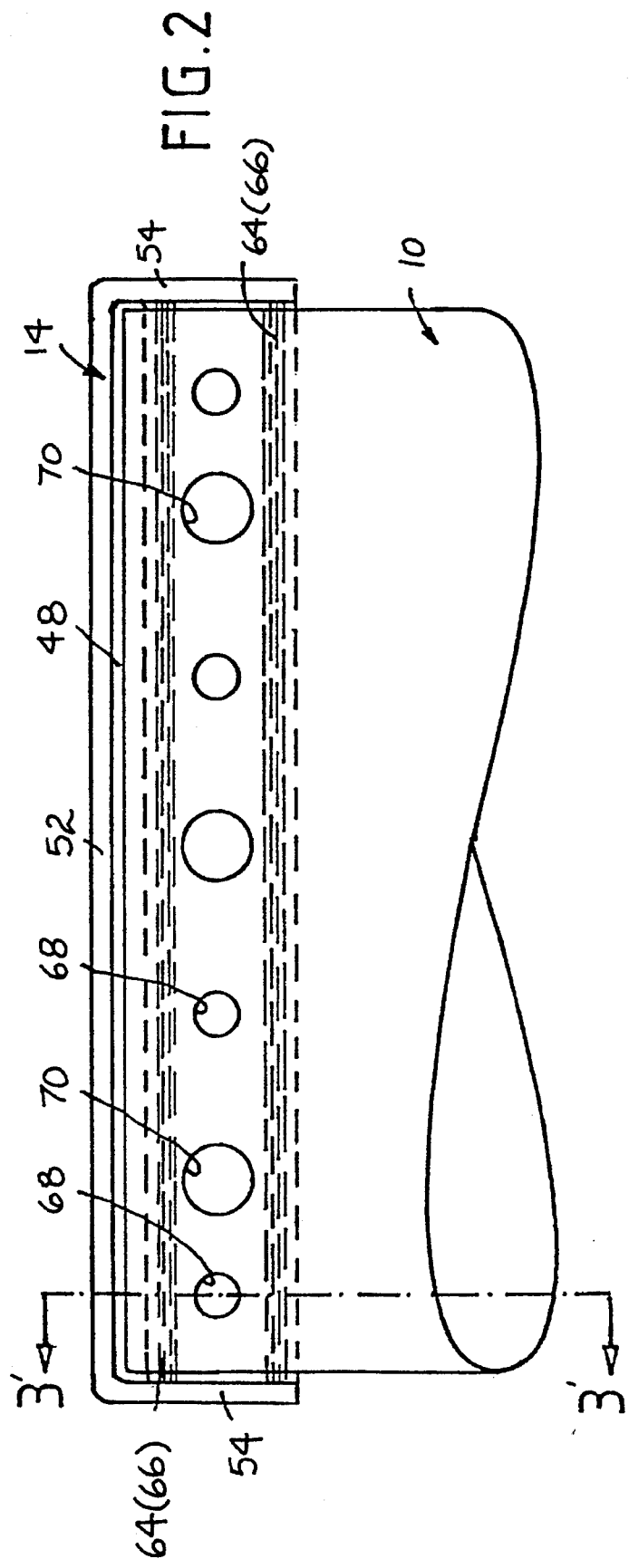
FIG. 2 is a top view of the holed strip, with the end of the hose just resting on it, immediately before the peg strip is pressed onto it.

The longitudinal spacings of the pegs 20 and thus also of the holes 30 are identical to one another, but the two end pegs 20 are located as close as possible to the folded parts of the two layers of hose 40, 42 which are pressed together, as can be seen from FIG. 1. Said folded parts are identified by reference numeral 44.

Between every two holes 30 in the holed strip 14 there is in each case a cylindrical lug 46 projecting from the clamping surface 18—and aligned longitudinally with those holes—with a central hole 74 passing completely through the holed strip 14.

Seen in the longitudinal direction of the hose, the holed strip 14 is formed broader than the peg strip 12, and on one side there is, adjoining the clamping surface 18 of the holed strip 14, a receiving chamber 48, open at the top, for receiving an edge of the hose 50 extending beyond the clamping surfaces 16, 18. The chamber 48 is delimited by a front wall 52 which projects upwardly over the clamping surface 18 and encloses the peg strip 12 at the front. Said front wall 52 passes on both sides into equally high side walls 54, which extend over the entire width of the holed strip 14.

Figure 3:
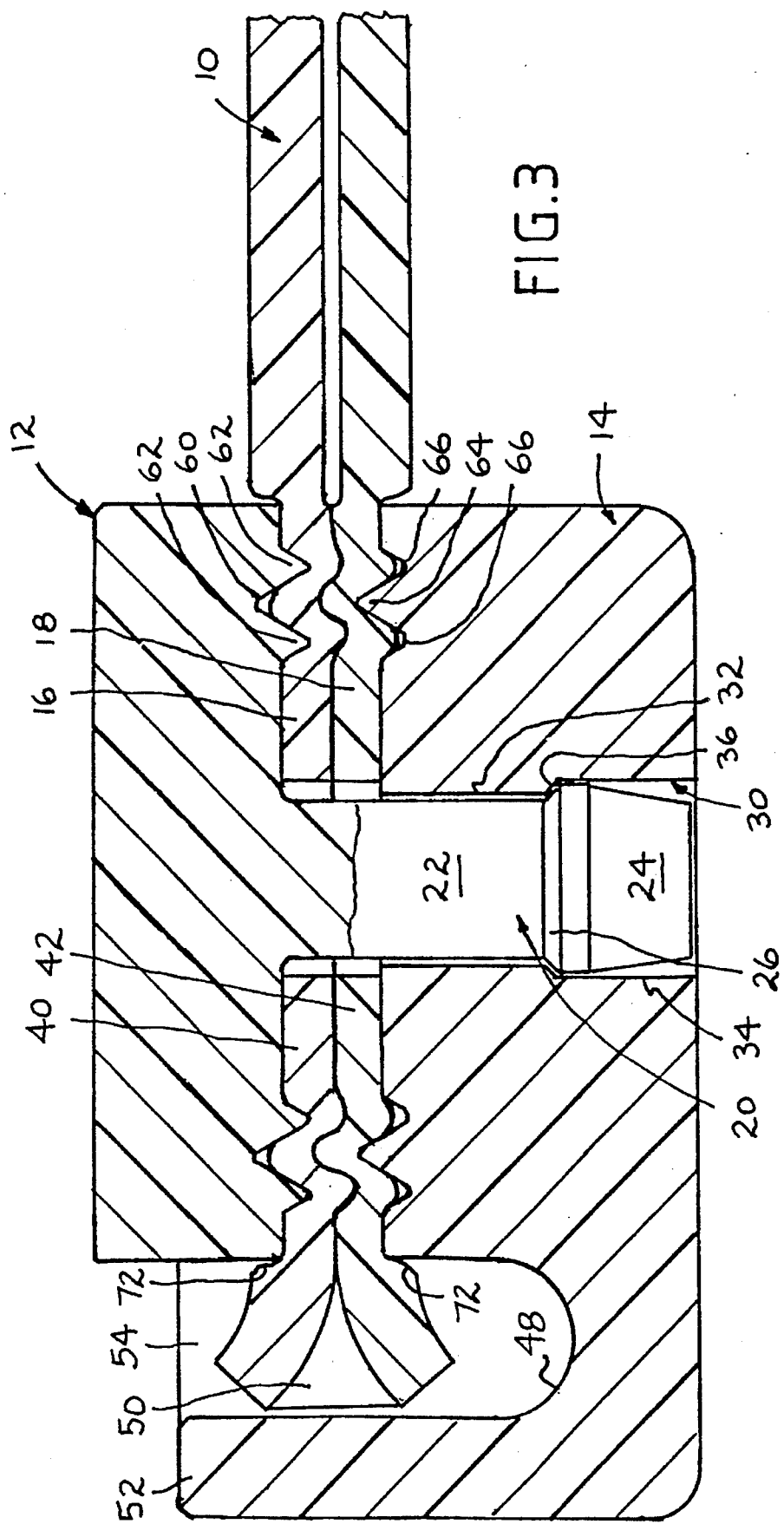
FIG. 3 shows a sectional view, seen in the longitudinal direction of the hose, through the clamping strip unit, on a larger scale and taken along line 3—3 of FIG. 1, and along line 3'—3' of FIG. 2.

In cross-section, as shown in FIG. 3, the clamping surface 16 is wavy or zigzag in shape between the peg 20 and each of the two longitudinal sides of the peg strip 12, and has a groove 60 and two adjoining ribs 62 protruding about 1 mm. above the clamping surface 16. Assigned to the groove 60 is a central rib 64, 1 mm. high, on the clamping surface 18 of the holed strip, with grooves 66, each likewise 1 mm. in depth, adjacent thereto on both sides. This rib-and-groove system extends in exactly the longitudinal direction of the strips 12, 14 and thus parallel to the row of pegs or row of holes respectively.

Sealing a piece of hose 10 in a pressure-tight manner requires only very little effort with the two strips 12, 14 designed in this way. The end of the hose 10, folded flat, with four holes 68 and punched-out sections 70 between them in each case, is inserted into the holed strip 14, which has previously been placed in the lower part of a press, the front wall 52 of the holed strip 14 serving as the front stop, and the side walls 54 serving as lateral guides for the end of the hose. When the end of the hose is deposited, the cylindrical lugs 46 pass through the punched-out sections 70. The end of the hose is thus positioned absolutely securely on the clamping surface 18 of the holed strip 14. The four other holes 68 in the two layers 40, 42 of the end of the hose are then aligned with the holes 30. At this point, the peg strip is moved downwards by the upper part of the press. The tapered end of the head 24 passes in each case through the holes 68 in the layers of hose 40, 42 and then into the hole portion 32 with the smaller diameter. When the peg 20 is introduced further into the hole 30, the hole portion 32 is expanded elastically by the head thickening. Shortly before the clamping position is reached, the two layers of hose 40, 42 are pressed together and are thus deformed into the rib-and-groove systems 60–66. In this clamping position, the annular collar 26 between the head 24 and the shank 22 has reached the supporting surface 36 of the hole 30, so that the peg 20 latches into the hole 30 like a barb. The two strips 12, 14 are thus inseparably joined together, and the hose 10 is sealed absolutely tight in the clamped region. The two layers of hose 40, 42 are also protected in a positive fit against high tensile forces in the longitudinal direction of the hose 10 thanks to the rib-and-groove systems 60–66, on the one hand, and the collars 72, on the other, these having formed between the sections of hose pressed together in the region of the clamping surface and the protruding edge of the hose 50 in the chamber 48.

I claim:

1. A lifting hose for raising and lowering a lift platform of a lifting apparatus useful for insertion in a bathtub, the lifting hose consisting of a fabric-reinforced, pressure-tight, flexible, substantially non-expandable material and being sealed pressure-tight at its ends by means of clamping elements, whereby each clamping element consists of two clamping strips having clamping surfaces of equal size respectively facing one another and disposed transversely to the longitudinal direction of the lifting hose, the two strips are made of plastic, a plurality of pegs aligned longitudinally protrude at right angles from the clamping surface of one of the strips, each peg having a cylindrical shank and a thickened head part, tapering towards the end, an annular collar being formed between said head part and said shank, a plurality of holes terminate at the clamping surface of the respective opposite strip, with each one of the plurality of holes in the hose strip assigned to each one of the plurality of pegs of the peg strip, when the end of the lifting hose is pressed flat, there are punched holes in the two mutually adjacent layers of material, arranged in a manner exactly matching the plurality of holes in the holed strip and having a diameter at least equal to the smallest diameter of one of the plurality of holes in the holed strip, each hole in the holed strip has, adjacent to the clamping surface, a first hole portion of small diameter for receiving the shank of one of the plurality of pegs, and a second portion of larger diameter for receiving the head part of one of the plurality of pegs, and an annular supporting surface formed between the two hole portions supporting the annular collar of one of the plurality of pegs and forming an inseparable counterbearing when the two strips are pressed together with the compressed end of the lifting hose inserted between them, the two mutually adjacent layers of the lifting hose having a thinner wall thickness in the region of the clamping surfaces than in the neighboring region, and whereby the clamping elements are attached to the hose at distances from the ends thereof respectively, and the two clamping elements are supported, in a positive fit, on counter-bearing collars formed between the two layers of the protruding edge of the hose not being pressed together, and the sections of hose pressed together in the region of the clamping surfaces, and whereby one clamping strip is greater in width when measured in the longitudinal direction of the hose than the other clamping strip and adjacent to the clamping surface of the wider strip, there is a chamber for receiving the protruding edge of the hose is formed, said chamber being determined by a front wall of said wider strip.

2. Lifting hose as claimed in claim 1, wherein together with its two clamping elements at each end, the lifting hose forms a single assembly unit which can be firmly attached to the lifting apparatus by means of said clamping elements.

3. Lifting hose as claimed in claim 2, wherein the clamping elements are adapted to be detachably fixed to the lifting apparatus, retaining the pressure-tight ends of the hose.

4. Lifting hose as claimed in claim 1 wherein a groove is formed in the clamping surface of one strip between the plurality of holes and at least one longitudinal edge of that strip, running parallel to said longitudinal edge, and a rib corresponding to said groove is formed in the other strip, whereby the layers of hose are deformed into a wave shape in a region of the rib and the groove, when seen in cross-section.

5. Lifting hose as claimed in claim 4, wherein at least one groove and one adjacent rib are formed on each strip.

6. Lifting hose as claimed in claim 1, wherein the wider strip is the strip containing holes, and the wider strip comprising a plurality of projecting cylindrical lugs, each one between two holes respectively, and longitudinally aligned with said holes, and wherein matching cavities are provided in the other strip, and matching punched-out sections are provided in the two layers of the hose as a positioning aid.

7. Lifting hose as claimed in claim 6, wherein the strip has a number of assembly holes which pass coaxially through the lugs respectively.

8. Lifting hose as claimed in claim 1, wherein one of the strips has a front wall extending over its entire length and projecting at right angles to the plane of the clamping surfaces, and two equally high side walls extending over its width, and said three walls form a three-sided mount for the other strip.

* * * * *